Figure 1:
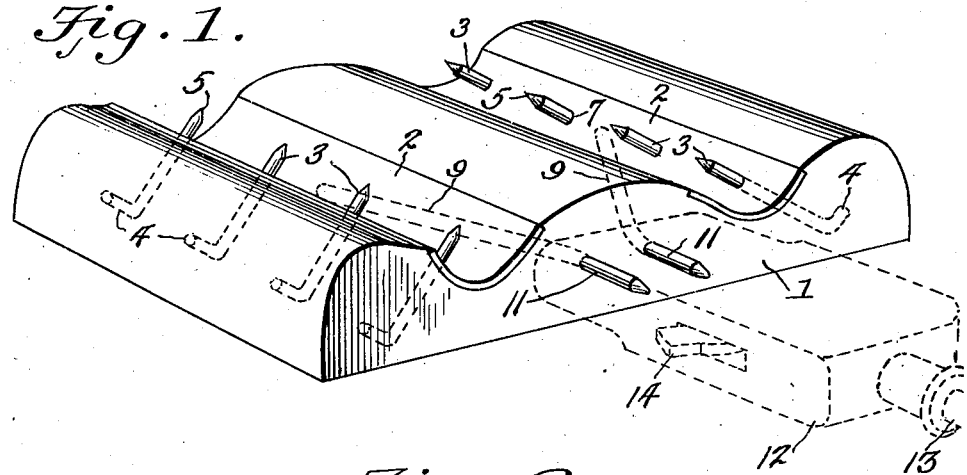

July 9, 1935.  C. N. SMITH  2,007,260

ELECTRIC COOKER

Filed July 19, 1934

Inventor
Clinton N. Smith
By Frank B. Hoffman
Attorney

Patented July 9, 1935

2,007,260

UNITED STATES PATENT OFFICE 2,007,260

ELECTRIC COOKER

Clinton N. Smith, Clayville, N. Y.

Application July 19, 1934, Serial No. 736,075

5 Claims. (Cl. 219—19)

This invention relates to new and useful improvements in electrical cookers, and has for its primary object to provide a simple and inexpensive device which may be readily used to quickly cook food products, such as Frankfurters, by passing an electric current directly through them, whereby the food product forms part of an electric circuit and is adapted to offer sufficient resistance in connection with the passage of the current to raise the temperature of the food product and thereby materially assist in and expedite the cooking.

Another object of the invention is to provide an electric cooker constructed as a unit with no movable parts, which may be readily and quickly connected by an electric cord, preferably one having a hand operable switch therein, to any ordinary electric light or other electric current socket.

A further object of the invention is to provide an electric cooker which will operate either on alternating or direct current, but which will operate more quickly on direct current, and one in which the cooking is accomplished by passing the current directly through the center of the Frankfurter, whereby the latter will be cooked from the inside to the outside instead of from the outside to the inside as is the custom in the usual cooking of these food products, thus enabling a more rapid cooking.

A still further object of the invention is to provide an electric cooker constructed as a single unit, embodying spaced diametrically opposed impaling means arranged in and forming part of an electric circuit, said means adapted to be embedded in the opposite ends of one or more Frankfurters to support the same in cooking position, whereby the latter constitute part of the circuit.

A still further object of the invention is to provide an electric cooker constructed as a single unit embodying an insulated base carrying spaced parallel metal troughs arranged in circuit, a plurality of impaling elements embedded in the base of the cooker and projecting upwardly through each of said troughs and adapted to receive and support the opposite ends of one or more Frankfurters in an arched cooking position, said troughs being also adapted to catch and hold the hot grease or juices that exude from the Frankfurters as they are cooked.

With these and other objects in view as will more fully appear hereinafter, the invention comprises the various novel features of construction, combination and arrangements of parts described hereinafter and set forth with particularity in the appended claims.

Referring to the drawing:—

Figure 2:
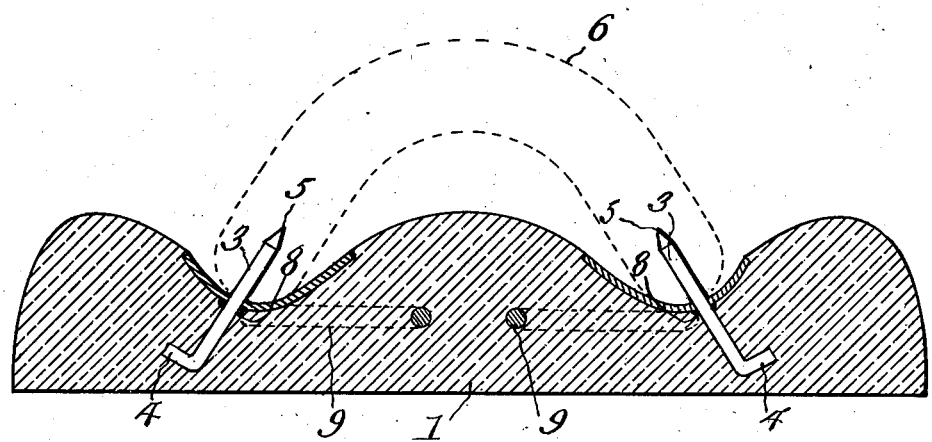
Figure 3:
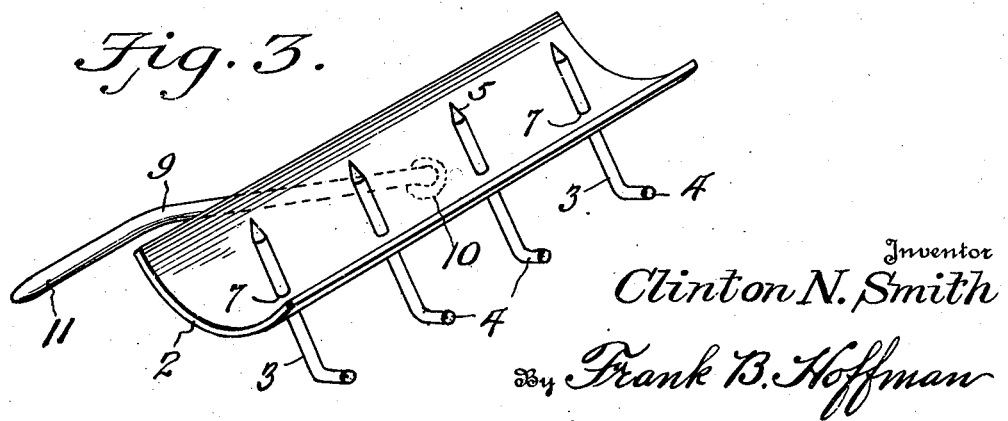

Figure 1 is a perspective view of my improved electric cooker, showing by dotted lines an electric cord with a hand operable switch detachably connected to the device, Figure 2 is a vertical transverse sectional view taken through the cooker, and Figure 3 is a detail perspective view of one of the impaling electrodes carried by the base of the device.

Referring more particularly to the drawing, the numeral 1 indicates a base made of suitable insulating or non-conducting material, which may be made in any desirable design or pattern. The top of the base is formed with spaced parallel suitably shaped depressions in which are positioned metallic troughs 2, made of non-corrosive material, such as stainless steel. The top of the base between these troughs is convex so that all juices that exude from the material being cooked will drain down into the troughs. Extending through each trough 2, at spaced intervals longitudinally thereof are impaling elements 3, made of any suitable non-corrosive material, and having their lower ends formed with right-angular portions 4, while their outer terminal ends are formed with sharp points 5, adapted to receive and be embedded in the terminal ends of a Frankfurter 6, as indicated by dotted lines in Fig. 2. Each of the impaling elements 3 are connected to the metal troughs 2 by being driven through somewhat restricted openings 7 therein, and then secured in position by solder as indicated by the numeral 8. In order to firmly secure the metal troughs 2 within the aforesaid depressions upon the base 1, the lower portions of the impaling elements 3 are embedded in the base 1 as clearly shown in Fig. 2.

It is to be noted that the impaling elements carried by each metal trough are arranged in upwardly converging relation to each other so as to enable the terminal ends of a Frankfurter to be quickly and easily impaled thereon to support it in cooking position.

An electrode 9, consisting of a heavy piece of stiff angular conductor wire, has one end rigidly connected to the underside of each metal trough 2, intermediate its ends by soldering or other suitable means 10. These electrodes 9 are firmly embedded in the base 1, and have their outer terminal ends projecting laterally from and beyond the side wall of the base 1 to provide parallel spaced arms or electrodes 11 adapted to receive a detachable hand operable switch plug 12, indicated by dotted lines in Fig. 1, to which is connected one end of an electric connector cord 13.

In the operation of the cooker, a Frankfurter, which is ordinarily practically straight, is bent into a curved position by impaling its opposite ends firmly down over the opposing impaling elements 3 until the terminal ends of the Frankfurter rest upon the bottom of the metal troughs 2. After detachably connecting the cooker to any ordinary electric light or other suitable electric socket, the current is turned on by throwing the switch 14 arranged in the plug 12, whereupon the current will flow in through one electrode 9, to the metal trough to which it is connected, fully charging the latter, then through the center of the Frankfurter to the opposite impaling element 3, its supporting metal trough 2, and the remaining electrode 9, back to the connector plug 12, thus completing the circuit. It has been found from experience that by passing an electric current directly through the center of the Frankfurter, the cooking process begins from the center and works outwardly and operates to cook the material more rapidly than can be accomplished through the ordinary process of cooking the material from the outside to the center. It has also been found from experience that the material impaled upon the device may be more quickly cooked by the use of direct current than with alternating current, although by the use of the latter current, the material may be likewise quickly and thoroughly cooked. Irrespective of which kind of current that may be used, by passing it through the center of the Frankfurter, the latter offers a certain amount of resistance to its passage which naturally raises the temperature of the material and thereby greatly assists in and expedites the cooking.

It will be further observed that the top of the base is so formed that all hot grease or juices that may exude from or be thrown off from the material being cooked will trickle or drain down into the metal troughs 2, where it may easily be disposed of.

While I have described the principle of the operation of the device, I desire to have it understood that such changes in construction, combination and arrangement of parts may be made as are within the scope of the claims and spirit of the invention.

I claim:—

1. An electric cooker comprising a non-conductor base having spaced parallel depressions formed in and extending entirely across the top thereof, a metal trough arranged in and co-extensive with each of said depressions, impaling elements carried by each of said troughs, and an electrode connected at one end to each trough, the other end of said electrode adapted to be detachably connected to an electric circuit for the purpose set forth.

2. An electric cooker comprising a non-conductor base having spaced depressions formed in and extending entirely across the top of said base, a metal trough positioned in each of said depressions; impaling elements carried by each of said troughs and adapted to have each upper end embedded within an article of food extending between said troughs in an arcuate position so that the drippings from the food article as it is cooked will fall and run into said troughs, and an electrode connected at one end to each trough and having the other end adapted to be detachably connected to an electric circuit for the purpose set forth.

3. An electric cooker comprising a non-conductor base having spaced depressions formed in and extending across the top of said base, a metal trough arranged in each of said depressions; spaced impaling elements carried by each of said troughs, each element having one end extending up above said trough and the other end embedded in said base; an electrode embedded in said base having one end connected to the embedded end of each series of said impaling elements on opposite sides of said base, and the other end projecting from said base and adapted to be detachably connected to an electric circuit for the purpose set forth.

4. An electric cooker comprising a non-conductor base having spaced parallel depressions formed in the top thereof, a metal trough arranged in each depression, a series of spaced impaling elements having one end embedded in said base and the other end projecting up through each of said troughs, electrodes embedded in said base on opposite sides thereof, each having one connected to the adjacent metal trough and the other end extending laterally from said base and adapted to be detachably connected to an electric circuit for the purpose set forth.

5. An electric cooker comprising a non-conductor base having spaced parallel depressions formed in the top thereof, a metal trough positioned in each of said depressions on said base, a plurality of spaced impaling elements carried by and extending through each metal trough, each impaling element having its lower end embedded in said base and its upper end extending up from said metal trough and terminating in a sharp point above the said trough, a conductor element embedded in each side of the base adjacent each metal trough, said conductor element having one end connected to the underside of the adjacent metal trough and the other end projecting laterally from and beyond the side wall of the base and adapted to be detachably connected in an electric circuit for the purpose set forth.

CLINTON N. SMITH.